(12) United States Patent
Baudasse et al.

(10) Patent No.: US 9,605,430 B2
(45) Date of Patent: Mar. 28, 2017

(54) TAPE SPRING RETRACTABLE DEPLOYABLE STRUCTURE AND METHOD

(71) Applicant: THALES, Courbevoie (FR)

(72) Inventors: Yannick Baudasse, Cannes la Bocca (FR); Stéphane Vezain, Cannes la Bocca (FR); Didier Stanek, Cannes la Bocca (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/805,359

(22) Filed: Jul. 21, 2015

(65) Prior Publication Data
US 2016/0024790 A1    Jan. 28, 2016

(30) Foreign Application Priority Data

Jul. 25, 2014   (FR) ..................................... 14 01711

(51) Int. Cl.
| | |
|---|---|
| *B64G 1/22* | (2006.01) |
| *E04C 3/00* | (2006.01) |
| *B64G 1/44* | (2006.01) |
| *B64G 1/50* | (2006.01) |
| *B64G 1/66* | (2006.01) |

(52) U.S. Cl.
CPC .............. *E04C 3/005* (2013.01); *B64G 1/222* (2013.01); *B64G 1/44* (2013.01); *B64G 1/503* (2013.01); *B64G 1/66* (2013.01)

(58) Field of Classification Search
CPC ......... E04B 1/34357; B64G 1/44; B64G 1/22; B64G 1/222; E04C 3/005
USPC ................................. 52/108; 242/172.6, 375
See application file for complete search history.

(56) References Cited

U.S. PATENT DOCUMENTS

| | | | | | |
|---|---|---|---|---|---|
| 3,213,573 | A | * | 10/1965 | Bohr ....................... | B21C 37/10 174/DIG. 11 |
| 3,564,789 | A | * | 2/1971 | Vyvyan ................... | E04C 3/005 52/108 |
| 3,785,590 | A | * | 1/1974 | Wentworth ............ | B64G 1/222 136/245 |
| 3,863,870 | A | * | 2/1975 | Andrews ................ | B64G 1/222 136/245 |
| 4,047,339 | A | * | 9/1977 | Smith ..................... | E04C 3/005 52/108 |

(Continued)

FOREIGN PATENT DOCUMENTS

| | | |
|---|---|---|
| EP | 2 471 713 A1 | 7/2012 |
| FR | 2 998 876 A1 | 6/2014 |

*Primary Examiner* — Beth Stephan
(74) *Attorney, Agent, or Firm* — Baker & Hostetler LLP (57) ABSTRACT

A retractable tape spring in-building method for a deployable structure comprising a main tape spring having an axis of deployment and of refurling substantially parallel to an unfurled axis X and comprising two ends, a secondary tape spring comprising two ends and a winding mandrel carried by a shaft parallel to an axis Z perpendicular to the axis X, the main tape spring being wound around the mandrel, a first end of the main tape spring being fixed to the mandrel, the method comprising the following steps: fixing a first end of the secondary tape spring a predefined distance away from a second end of the main tape spring, fixing a second end of the secondary tape spring on the mandrel. A deployable structure comprising a tape spring for a flexible structure is also provided.

11 Claims, 6 Drawing Sheets

(56) References Cited

U.S. PATENT DOCUMENTS

| | | | | |
|---|---|---|---|---|
| 4,991,784 | A * | 2/1991 | Schmid | B64G 9/00 |
| | | | | 242/390.3 |
| 7,617,639 | B1 * | 11/2009 | Pollard | B64G 1/222 |
| | | | | 343/915 |
| 7,694,465 | B2 * | 4/2010 | Pryor | E04C 3/005 |
| | | | | 138/119 |
| 7,856,735 | B2 | 12/2010 | Allezy et al. | |
| 7,895,795 | B1 * | 3/2011 | Murphey | B64G 1/222 |
| | | | | 52/108 |
| 2002/0112417 | A1 | 8/2002 | Brown et al. | |
| 2007/0262204 | A1 * | 11/2007 | Beidleman | B64G 1/222 |
| | | | | 244/172.6 |
| 2008/0290221 | A1 * | 11/2008 | Dupuis | B64G 1/222 |
| | | | | 244/172.6 |
| 2012/0167944 | A1 * | 7/2012 | Blanchard | B64G 1/44 |
| | | | | 136/245 |
| 2014/0151485 | A1 | 6/2014 | Baudasse et al. | |

* cited by examiner

TAPE SPRING RETRACTABLE DEPLOYABLE STRUCTURE AND METHOD

CROSS-REFERENCE TO RELATED APPLICATION

This application claims priority to foreign French patent application No. FR 1401711, filed on Jul. 25, 2014, the disclosure of which is incorporated by reference in its entirety.

FIELD OF THE INVENTION

The present invention relates to a retractable tape spring in-building method for a deployable structure. It also relates to a deployable structure comprising a tape spring. It applies notably to the field of space equipment that has to be deployed in orbit and more particularly to space equipment for satellites such as antennas, solar generators, heat screens, baffles or telescopes.

BACKGROUND

Structures deployable in space, of the solar generator type for example, are generally made up of rigid panels articulated to one another, these panels when in the stored position being stacked on top of one another. These structures have the advantage of having dynamic behaviour that is fully controlled but have the disadvantage of having a high inertia and mass per unit area. Furthermore, rigid structures when in a stored position occupy a significant amount of space under the cap of a launcher. Because the amount of space allocated to deployable structures under the cap of a launcher is limited, it is important to reduce the space occupied by these deployable structures when they are in the stored position, so as to optimize the surface area they represent in the deployed position.

There are deployable flexible planar structures that comprise a flexible fabric and tape springs fixed to one and the same plane of the fabric. In the stored position, the fabric and the tape springs are wound around a mandrel. Deployment of the flexible planar structure is brought about autonomously by the spontaneous unwinding of the tape springs when the mandrel is free to rotate.

Indeed tape springs are known in the field of space as being flexible tapes with a circular arc-shaped cross section, the radius of curvature of which circular arc is convex on a first face and concave on a second face, these tapes being able to pass from the wound state to the unwound state essentially through their own elastic energy. There are various types of tape that have their own properties. Monostable tapes have a deployed natural position and need to be held in the stored position. Monostable tape springs therefore have a natural tendency to deploy in order to regain their unwound state. The deployment of monostable tapes is often disorganized and uncontrolled. Bistable tapes have two natural positions (stored position and deployed position) and do not need to be held in the stored position when the cross section is fully flattened. Their deployment is linear and controlled. However, in both instances, when deployment is initiated it may be violent and generate shocks, which means to say that the entire tape spring may have a tendency to straighten out simultaneously, over its entire length, presenting a problem of damage to surrounding elements or elements fixed to the tape spring such as a flexible membrane, an instrument, an antenna, etc. Conventional tape springs may thus present difficulties in terms of controlling their deployment. In order to regulate the speed of deployment of this type of structure, there are a number of methods that can be used. Mention may for example be made of regulation using an electric geared motor unit as described in patent application FR12/03300 or thermal regulation using hybrid tape springs as described in patents FR 0803986 and U.S. Pat. No. 7,856,735.

Furthermore, the stiffness of the tape springs varies according to the axis of stressing. A force F applied to the convex face of the tape spring will have a tendency to cause the tape spring to flex, whereas the same force applied to the concave face will have no effect, and this presents a problem of instability of the flexible structure in its deployed state. In order to address this problem of stability in the deployed state, it is therefore necessary for the tape spring to be kept in the deployed position by an additional retaining means or for the tape spring to be over-engineered so that it remains stable under the orbital forces, whatever the direction in which these are applied.

Thus, in the stored configuration, the tape spring needs to be as compact as possible, which means to say that it needs to have the smallest possible radius of winding. This parameter is given by the physical characteristics of the tape; in general the radius of winding is substantially equal to that of its radius of curvature. In the case of a composite tape, it may be altered by changing the order of stacking of the plies and/or the direction of the fibres. In the deployed configuration, the best possible rigidity is sought, which means the largest and most closed cross section possible, combined with the end of the tape spring being built in as far as possible.

SUMMARY OF THE INVENTION

The invention seeks to alleviate all or some of the problems mentioned hereinabove by proposing a retractable tape spring in-building method for a deployable structure, having the advantages of occupying very little space, being simple to produce, optimizing the volume of the deployable structure when it is stored under the cap of a launcher, allowing control over deployment and the ability to refurl and affording the structure rigidity and stability when deployed.

To this end, one subject of the invention is a retractable tape spring in-building method for a deployable roll-up structure, comprising a main tape spring having an axis of deployment and of refurling substantially parallel to an unfurled axis X and comprising two ends, a secondary tape spring comprising two ends and a winding mandrel carried by a shaft parallel to an axis Z perpendicular to the axis X, the main tape spring being wound around the mandrel, a first end of the main tape spring being fixed to the mandrel, characterized in that it comprises the following steps:
 fixing a first end of the secondary tape spring some distance from a second end of the main tape spring,
 fixing a second end of the secondary tape spring on the mandrel.

Advantageously, the retractable in-building method may comprise beforehand a step of fixing the second end of the main tape spring at a distinct spot.

Advantageously, the method may comprise the following steps:
 simultaneous deployment of the main tape spring substantially parallel to the axis X and of the secondary tape spring,
 formation of a triangulated structure between the main tape spring, the secondary tape spring and the mandrel.

Advantageously, the method may further comprise a step of rewinding the main tape spring, and the rewinding of the main tape spring may be obtained by buckling the secondary tape spring.

Advantageously, the main tape spring may comprise two faces, the first end of the secondary tape spring may be fixed to a first face of the second end of the main tape spring, and the buckling of the secondary tape spring may be obtained by applying a force to the middle of the tape spring and normal to the secondary tape spring.

Advantageously, the force may be applied between the first end of the secondary tape spring and the second end of the main tape spring.

Advantageously, the retractable in-building method may further comprise a step of fixing the first end of the main tape spring to the middle of the mandrel.

Advantageously, the deployable structure may comprise at least two rollers mounted facing each other at the periphery of the mandrel, the rollers may be in contact with the main tape spring, and the rollers and the shaft may have a degree of freedom to rotate about the axis Z relative to one another. The retractable in-building method may comprise the following steps:

local guidance of the main tape spring by the rollers,
deployment of the main tape spring in a direction substantially parallel to the axis X.

Advantageously, the rollers may be heating rollers and the retractable in-building method may comprise beforehand a step of local heating of the main tape spring by the heating rollers.

Another subject of the invention is a deployable structure comprising a main tape spring extending in a deployed position along an axis X and comprising two ends, a secondary tape spring comprising two ends and a winding mandrel carried by a shaft along an axis Z perpendicular to the axis X, the main tape spring being wound around the mandrel, a first end of the main tape spring being fixed to the mandrel, characterized in that a first end of the secondary tape spring is fixed some distance from the first end of the main tape spring, and in that a second end of the secondary tape spring is fixed to the mandrel at a point distinct from the point of the first end of the main tape spring.

Advantageously, the deployable structure comprises at least two rollers mounted facing each other at the periphery of the mandrel, the rollers being in contact with the main tape spring, the rollers and the shaft being fixed, the mandrel having a degree of freedom to rotate about the axis Z, the rollers being able to guide the main tape springs.

Advantageously, the rollers are heating rollers.

BRIEF DESCRIPTION OF THE DRAWINGS

The invention will be better understood and further advantages will become apparent from reading the detailed description of one embodiment given by way of example, which description is illustrated by the attached drawing in which.

For the sake of clarity, the same elements will bear the same references in the various figures.

DETAILED DESCRIPTION

Figure 1A:
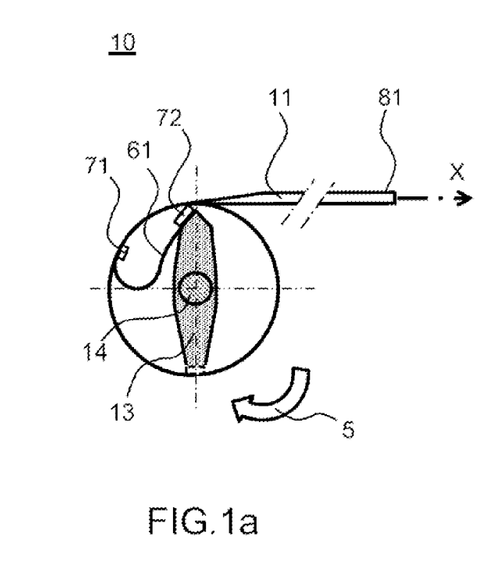
FIGS. 1a-1c illustrate, by way of three diagrams, and in cross section in a plane perpendicular to the axis Z, the deployment of a main tape spring according to the invention.
Figure 1B:
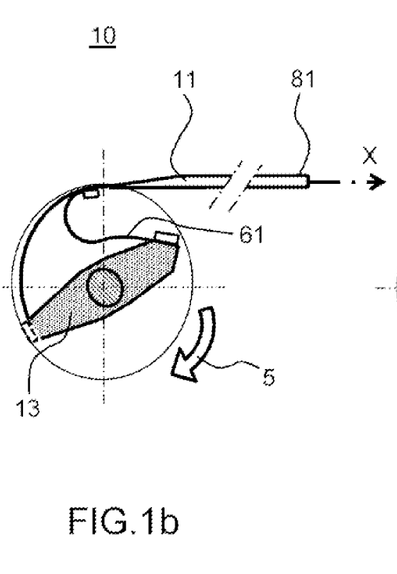
Figure 1C:
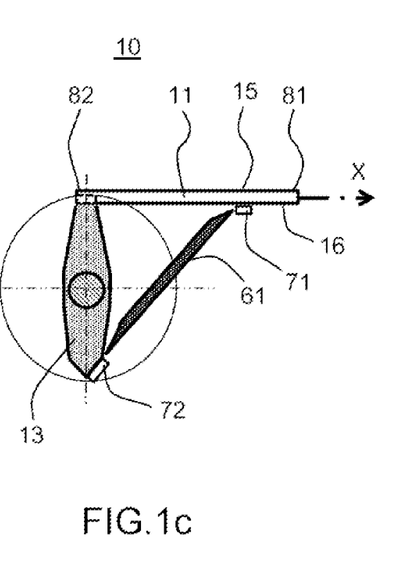

FIGS. 1a-1c illustrate, by way of three diagrams, and in cross section in a plane perpendicular to an axis Z, a deployable structure 10 with a main tape spring 11 according to the invention. The structure 10 comprises the main tape spring 11 extending in the deployed position along an axis X and comprises two ends 81, 82. The structure 10 comprises a secondary tape spring 61 which comprises two ends 71, 72. The deployable structure 10 also comprises a winding mandrel 13 which is carried by a shaft 14 along the axis Z perpendicular to the axis X. The main tape spring 11 is wound around the mandrel 13. A first end 82 of the main tape spring 11 is fixed on the mandrel 13. According to the invention, the retractable in-building method comprises the following steps:

fixing a first end 71 of the secondary tape spring 61 some distance from a second end 81 of the main tape spring 11,
fixing a second end 72 of the secondary tape spring 61 to the mandrel 13 at a point distinct from the point of the first end 82 of the main tape spring 11.

An arrow 5 indicates the direction of rotation of the mandrel 13. In diagram 1a, the arrow 5 is turning in the clockwise direction. The main tape spring 11 is wound around the mandrel 13 and part of the main tape spring 11 comprising the end 81 is deployed parallel to the unfurled axis X. In diagram 1b, the mandrel 13 has rotated about the axis Z in the clockwise direction as indicated by the arrow 5. The main tape spring 11 deploys further along the axis X. The secondary tape spring 61 remains wound, its two ends 71, 72 being fixed respectively to the end 81 of the main tape spring 11 and to the mandrel 13. In diagram 1c, the main tape spring 11 is fully deployed. The secondary tape spring 61 is likewise in the deployed position and forms a triangulated structure with the main tape spring 11 and the mandrel 13. The triangulated structure thus obtained constitutes a strut that ensures that the main tape spring 11 is held firmly and confers good rigidity upon it.

Figure 2:
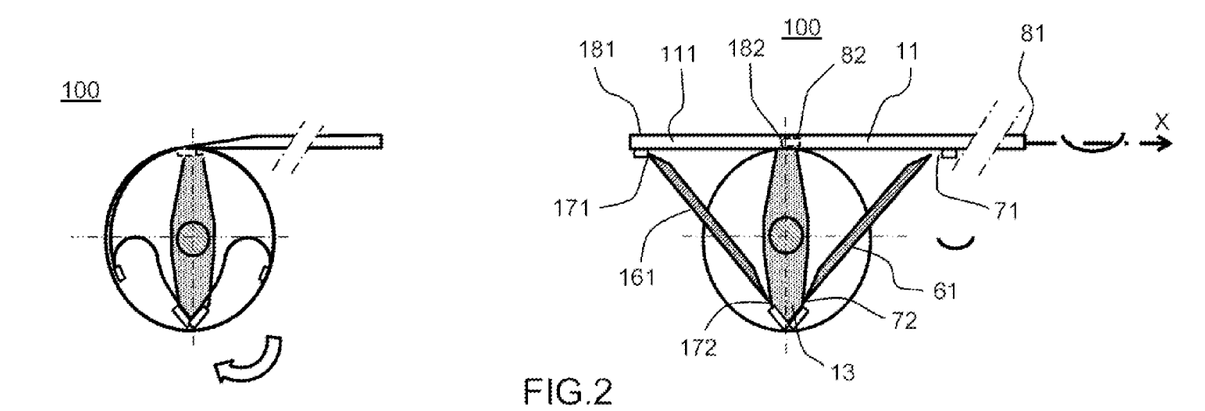
FIG. 2 depicts a first alternative form of the deployable structure of two tape springs in the semi-deployed and deployed configuration according to the invention.

FIG. 2 depicts a first alternative form of a deployable structure 100 comprising two tape springs in the semi-deployed and deployed configuration according to the invention. All the elements of the deployable structure 100 of FIG. 2 are identical to the elements of the deployable structure 10 of FIGS. 1a-1c. In addition, the deployable structure comprises a second main tape spring 111 which has an axis of deployment and of refurling substantially parallel to the unfurled axis X, and deploys in the opposite direction to the direction of deployment of the first main tape spring 11. The second main tape spring 111 has two ends 181, 182. The deployable structure 100 comprises a second secondary tape spring 161 which comprises two ends 171, 172. The second main tape spring 111 is also wound around the mandrel 13. Just like the first main tape spring 11, a first end 182 of the main tape spring 111 is fixed on the mandrel 13. And just like the first secondary tape spring 61, the second secondary tape spring 161 is wound, its two ends 171, 172 being fixed respectively to the end 181 of the main tape spring 111 and to the mandrel 13. The presence of two main tape springs means that a flexible structure with a larger surface area can be deployed with the deployable structure still being held firmly and suitably rigid.

Figure 3:
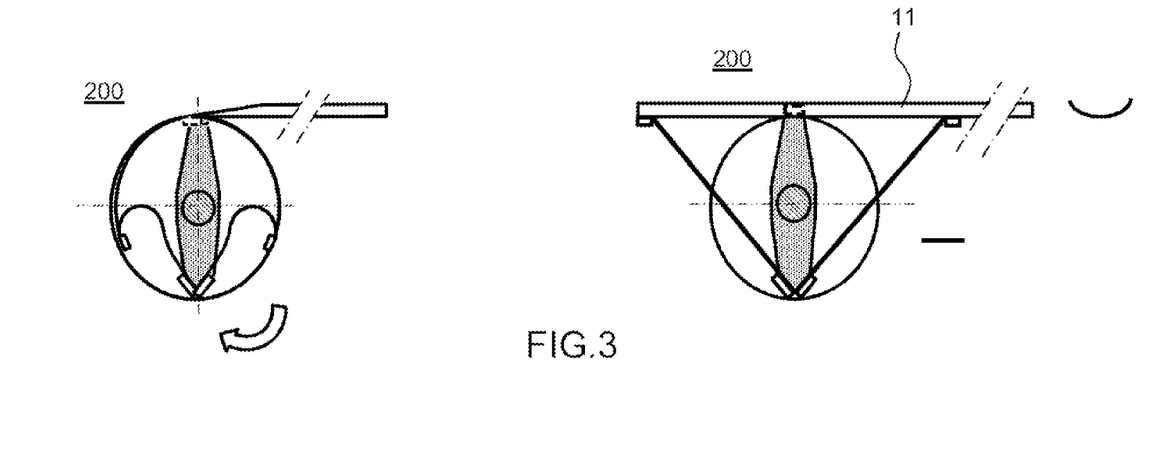
FIG. 3 depicts a second alternative form of the deployable structure of two tape springs in the semi-deployed and deployed configuration according to the invention.

FIG. 3 depicts a second alternative form of a deployable structure 200 of two tape springs in a semi-deployed and deployed configuration according to the invention. All the elements of FIG. 3 are identical to the elements of FIG. 2. In FIG. 3, unlike in FIG. 2, there will no longer be any discussion of secondary tape springs but rather of secondary struts, because these are not strictly speaking tape springs. Nevertheless, the struts considered contribute in the same way to forming a triangulated structure consisting of a strut.

In FIG. 3, the two secondary struts are flat blades. A flat blade in the deployed configuration offers good strength in tension, but no strength in compression. In the deployed position, the blade 61 greatly improves the stiffness of the whole in the directional sense of lowest stiffness of the tape spring (torque in the anticlockwise direction about Y). The opposite blade 161 greatly improves the stiffness of the whole in the opposite sense of lowest stiffness of the tape spring (torque in the clockwise direction about Y).

By contrast, it offers greater storage capability than a tape spring because a very small cross section is generally enough to react tensile loadings.

In order to save space in the stored position and allow for winding, it may therefore be conceivable to use cables, flat blades or flexible strips in place of the tape springs. However, these work in tension only. They therefore need to work in pairs placed in opposition, using the stiffness of the main tape spring. This is because when torque is applied to the main tape spring, one flexible strip opposes the force, whereas if a torque is applied in the other direction, it is the opposite flexible strip that acts.

The secondary tape springs constitute a triangulation system on the tape spring 11.

Figure 4:
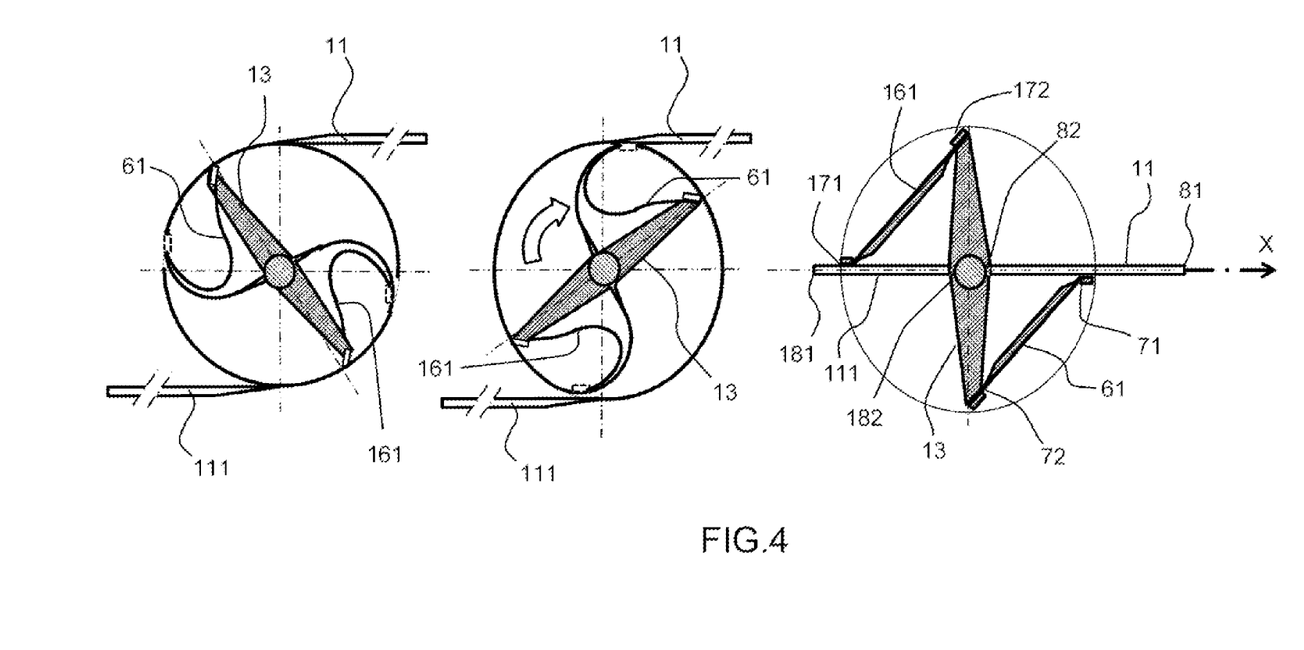
FIG. 4 depicts a third alternative form of the deployable structure of two tape springs in the semi-deployed and deployed configuration according to the invention.

FIG. 4 depicts a third alternative form of a deployable structure of two tape springs in a stored, semi-deployed and deployed configuration according to the invention. All the elements of FIG. 4 are identical to the elements of FIG. 2. In FIG. 4, the first end 82 of the main tape spring 11 is fixed to the middle of the mandrel 13. Likewise, the first end 182 of the second main tape spring 111 is fixed to the middle of the mandrel 13. The two secondary tape springs 61, 161 are wound, their two ends 71, 72 and 171, 172 respectively being fixed to the ends 81 and 181 respectively of the main tape springs 11 and 111 and to the mandrel 13. As explained earlier, the presence of two main tape springs means that a flexible structure with a larger surface area can be deployed while at the same time holding the deployable structure firmly and with good rigidity using the two struts. In addition, this configuration, in addition to offering a large surface area of flexible structure in the deployed position, has the advantage of not being bulky in the stored position. Moreover, because the main tape springs 11, 111 are wound around the mandrel 13 and fixed at the middle thereof, the whole has good stability and high stiffness at the in-building. In addition, the mandrel 13 is not positioned at the end of the structure once the main tape springs 11, 111 have unwound. This feature plays an important part in the rigidity of the structure.

However, it may be noted that FIG. 4 depicts two main tape springs 11 and 111 although the invention equally applies to the scenario with just one main tape spring fixed to the mandrel between its two ends.

Figure 5:
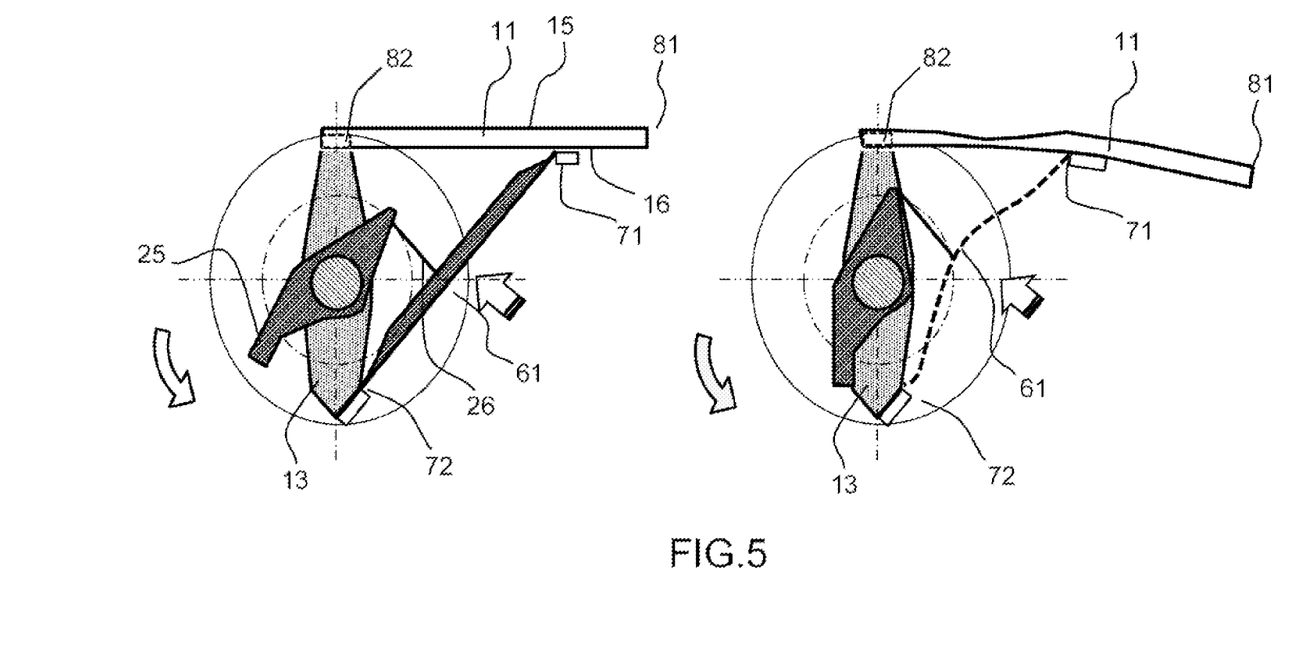
FIG. 5 depicts the buckling of the secondary tape spring in order to obtain the rewinding of the main tape spring.

FIG. 5 depicts the buckling of the secondary tape spring 61 in order to cause the rewinding of the main tape spring 11. The main tape spring 11 comprises two faces 15, 16. The first end 71 of the secondary tape spring 61 is fixed to a first face 16 of the second end 81 of the main tape spring 11. The refurling of the strut made up of the tape spring 61 may be achieved by buckling this tape spring. Buckling may be obtained by applying a force to the middle of the secondary tape spring and normal thereto. By acting in this way, the secondary tape spring 61 buckles, which means to say that it no longer forms the triangulated structure with the main tape spring 11 and the mandrel 13. The part of the secondary tape spring 61 that is situated between the two ends 71 and 72 moves closer to the mandrel and has a tendency to rewind. The buckling thus initiated allows the structure to be rolled up. Because the end 71 of the secondary tape spring 61 is fixed to the end 81 of the main tape spring 11, the main tape spring 11 is no longer in its fully deployed position. It can therefore rewind.

The force applied perpendicular to the main axis of the main tape spring 61 may be a force applied manually or by motor means.

In general, in actual use, the deployable structure 10 is used for just one deployment. However, further mission requirements are arising; notably the transfer or towing of a satellite from a low orbit to a high orbit. At the time of docking, for steering the transfer vehicle, the lowest possible amount of inertia is required, which means to say that the presence of large-sized deployable structures is unfavourable. It is also necessary to avoid any interference with the satellites that are to be docked. As a result, it is preferable to roll up the deployable structures. When the satellite has been docked, the structure can be deployed again.

One alternative to the application of force to the main tape spring 11 is also set out in FIG. 5. In FIG. 5, a component 25 is positioned on the mandrel 13. The component 25 is capable of rotational movement about the axis Z. Fixed to this component 25 is a flexible cable or blade 26 connecting the component 25 to the secondary tape spring 61. A rotation of the component 25 in the direction corresponding to the direction of refurling of the main tape spring moves the secondary tape spring 61 towards the mandrel 13 and thus initiates buckling. The component 25 then comes into abutment with the mandrel 13 and thus drives the latter, allowing the main tape spring 11 to be wound, the secondary tape spring 61 no longer forming a triangulated structure with the main tape spring 11 and the mandrel 13. As explained earlier, that part of the secondary tape spring 61 that is situated between the two ends 71 and 72 moves closer to the mandrel and has a tendency to rewind. Because the end 71 of the secondary tape spring 61 is fixed to the end 81 of the main tape spring 11, the main tape spring 11 is no longer in its fully deployed position. It may therefore rewind.

Figure 6:
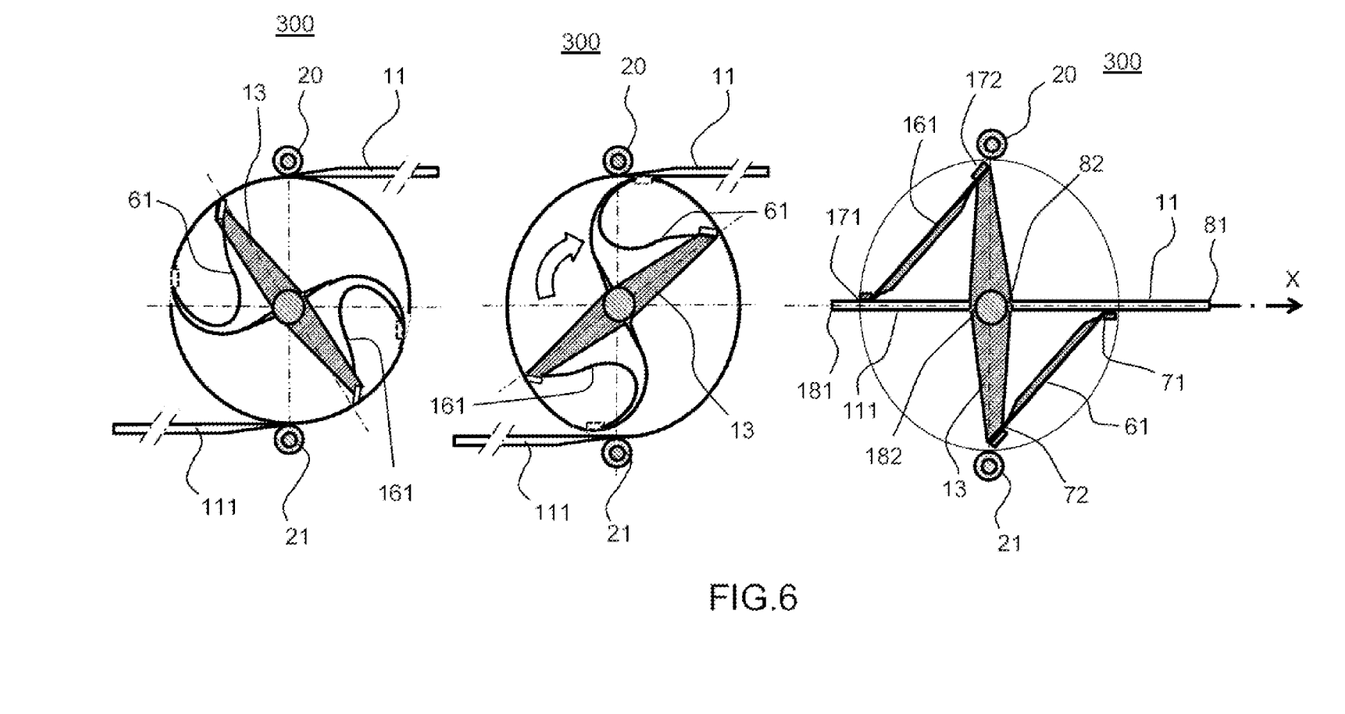
FIG. 6 depicts another alternative form of the deployable structure of two tape springs in the semi-deployed and deployed configuration according to the invention.

FIG. 6 depicts another alternative form of two tape springs of a deployable structure 300 in a semi-deployed and deployed configuration according to the invention. All the elements of FIG. 6 are identical to the elements of FIG. 4. In FIG. 6, the deployable structure 300 further comprises at least two rollers 20, 21 mounted facing each other at the periphery of the mandrel 13. The rollers 20, 21 are in contact with the tape springs 11, 111. The rollers 20, 21 and the shaft 14 are fixed, and the mandrel 13 has a degree of freedom to rotate about the axis Z. The rollers 20, 21 are able to guide the main tape springs. The rollers 20, 21 perform a function of guiding the tape springs 11, 111. The two rollers 20, 21 notably allow the tape springs 11, 111 to wind up correctly around the mandrel 13 during a refurling phase and allow the possibility of the tape spring being refurled in flight, for example when the flexible structure is mounted on a satellite.

To regulate the deployment of the tape springs, it is possible to heat the mandrel 13. Advantageously, the rollers 20, 21 may be heating rollers. The heating rollers allow the tape springs to be warmed up locally at two points, advantageously diametrically opposite points, thus causing them to deploy and also causing the mandrel 13 to rotate which can therefore heat the cross section of tape spring then brought into contact with the rollers 20, 21, as indicated schematically in FIG. 6, the arrows indicating the rotation about the Z axis. The local heating by the heating rollers makes it possible to obtain regulated deployment of the structure. In addition, because the heating is local, this configuration is energetically economical because there is no need to heat the entire tape spring and/or the entire mandrel. This feature is particularly beneficial for use on a satellite.

Figure 7:
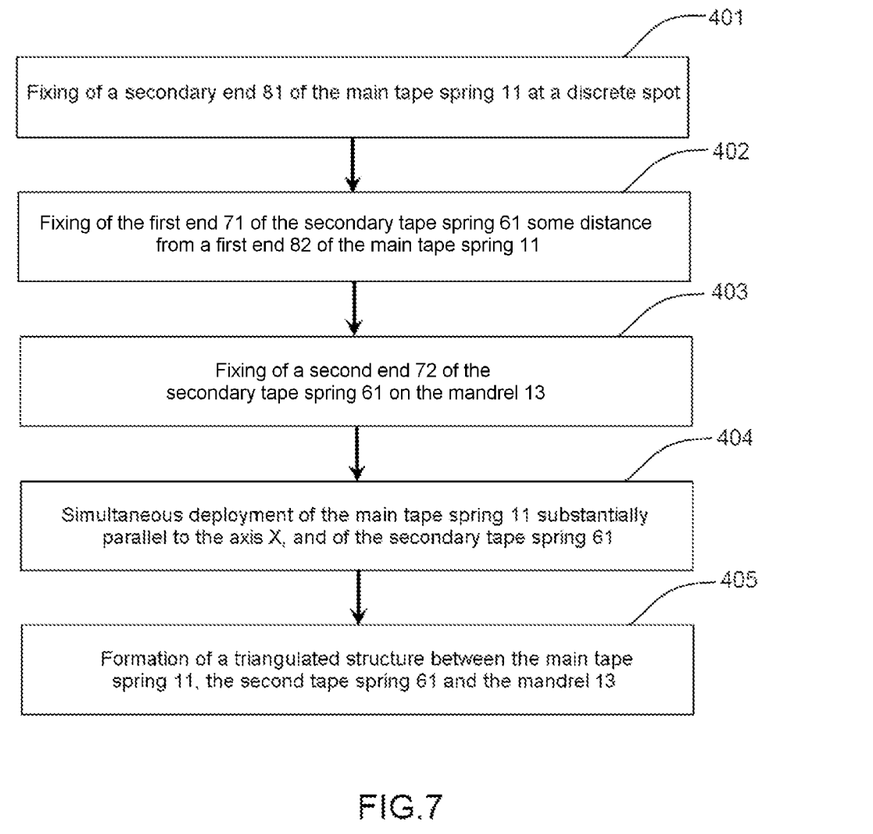
FIG. 7 depicts the steps of the retractable in-building method according to the invention.

FIG. 7 depicts the steps of the retractable in-building method according to the invention. The method comprises the following steps:
  fixing of the second end 81 of the main tape spring 11 at a discrete spot, step 401,
  fixing of the first end 71 of the secondary tape spring 61 some distance from a first end 82 of the main tape spring 11, step 402,
  fixing of a second end 72 of the secondary tape spring 61 on the mandrel 13, step 403,
  simultaneous deployment of the main tape spring substantially parallel to the axis X and of the secondary tape spring, step 404,
  formation of a triangulated structure between the main tape spring, the secondary tape spring and the mandrel, step 405.

Also of note are the simplicity of assembly and control and repeatability of the torque when deploying and refurling the tape springs.

The invention may be applied to hybrid tape springs consisting of a motive first structure (for example made of carbon fibre) that allows the tape spring to deploy, and a thermoelastic regulating part that encourages or limits deployment as a function of the temperature applied to it. Using a natural phenomenon of change of viscosity of a thermoplastic material (or of a material that has a transformation temperature appreciably lower than the transformation temperature of the material of the driving tape) with temperature guarantees good reliability and repeatability of the deployment.

The invention allows simplicity of assembly, having few components to assemble. Unwinding of the tape spring is well controlled. Specifically, the tape spring can be guided by the rollers 20, 21 and locally heated if the rollers 20, 21 are heating rollers, thus allowing its deployment to be regulated.

Finally, stacking is autonomous because it is obtained by the bistable nature of the hybrid tape spring that has two stable positions (wound and deployed).

The invention claimed is:

1. A retractable tape spring in-building method for a deployable structure, comprising a main tape spring extending in a deployed position along an axis X and comprising two ends, a secondary tape spring comprising two ends and a winding mandrel carried by a shaft along an axis Z perpendicular to the axis X, the main tape spring being wound around the mandrel, a first end of the main tape spring being fixed to the mandrel,
  the method comprising the following steps:
    fixing a first end of the secondary tape spring to the main tape spring spaced from the first end of the main tape spring,
    fixing a second end of the secondary tape spring to the mandrel at a point distinct from the first end of the main tape spring.

2. The retractable in-building method according to claim 1, further comprising the following steps:
  simultaneous deployment of the main tape spring substantially parallel to the axis X and of the secondary tape spring,
  formation of a triangulated structure between the main tape spring, the secondary tape spring and the mandrel.

3. The retractable in-building method according to claim 1, further comprising a step of rewinding the main tape spring, and the rewinding of the main tape spring is obtained by buckling the secondary tape spring.

4. The retractable in-building method according to claim 3, the main tape spring comprising two faces, wherein the first end of the secondary tape spring is fixed to a first face of the second end of the main tape spring, and wherein the buckling of the secondary tape spring is obtained by applying a force to the middle of the secondary tape spring and normal to the secondary tape spring.

5. The retractable in-building method according to claim 3, wherein the force is applied between the first end of the secondary tape spring and the second end of the main tape spring.

6. The retractable in-building method according to claim 1, further comprising a step of fixing the first end of the main tape spring to a middle of the mandrel.

7. The retractable in-building method according to claim 6, the deployable structure comprising at least two rollers mounted facing each other and mounted at a periphery of the mandrel, the rollers being in contact with the main tape spring, and the rollers and the shaft having a degree of freedom to rotate about the axis Z relative to one another, further comprising the following steps:
  local guidance of the main tape spring by the rollers,
  deployment of the main tape spring in a direction substantially parallel to the axis X.

8. The retractable in-building method according to claim 7, the rollers being heating rollers, comprising beforehand a step of local heating of the main tape spring by the heating rollers.

9. A deployable structure comprising a main tape spring extending in a deployed position along an axis X and comprising two ends, a secondary tape spring comprising two ends and a winding mandrel carried by a shaft along an axis Z perpendicular to the axis X, the main tape spring being wound around the mandrel, a first end of the main tape spring being fixed to the mandrel, wherein a first end of the secondary tape spring is fixed to the main tape spring spaced from the first end of the main tape spring, and a second end of the secondary tape spring is fixed to the mandrel at a point distinct from the first end of the main tape spring.

10. The deployable structure according to claim 9, further comprising at least two rollers mounted facing each other and mounted at a periphery of the mandrel, wherein the rollers are in contact with the main tape spring, and the rollers and the shaft are fixed, the mandrel having a degree of freedom to rotate about the axis Z, the rollers being able to guide the main tape spring.

11. The deployable structure according to claim 10, wherein the rollers are heating rollers.

\* \* \* \* \*

UNITED STATES PATENT AND TRADEMARK OFFICE
CERTIFICATE OF CORRECTION

PATENT NO. : 9,605,430 B2
APPLICATION NO. : 14/805359
DATED : March 28, 2017
INVENTOR(S) : Yannick Baudasse et al.

Page 1 of 1

It is certified that error appears in the above-identified patent and that said Letters Patent is hereby corrected as shown below:

In the Claims

Column 8, Lines 47-48 of Claim 8, "comprising beforehand a step of local heating" should be --comprising local heating--.

Signed and Sealed this
Sixth Day of June, 2017

Michelle K. Lee
*Director of the United States Patent and Trademark Office*